US010343478B2

(12) United States Patent
Coakley et al.

(10) Patent No.: US 10,343,478 B2
(45) Date of Patent: Jul. 9, 2019

(54) TRANSFER METHOD AND APPARATUS (71) Applicant: Carbon Air Limited, Manchester (GB)

(72) Inventors: John Fitzgerald Coakley, New Mills (GB); Rodolfo Gustavo Venegas, Salford (GB)

(73) Assignee: Carbon Air Limited, Manchester (GB)

( * ) Notice: Subject to any disclaimer, the term of this patent is extended or adjusted under 35 U.S.C. 154(b) by 0 days.

(21) Appl. No.: 15/129,797

(22) PCT Filed: Mar. 25, 2015

(86) PCT No.: PCT/GB2015/050890
§ 371 (c)(1),
(2) Date: Sep. 27, 2016

(87) PCT Pub. No.: WO2015/145148
PCT Pub. Date: Oct. 1, 2015

(65) Prior Publication Data
US 2017/0182858 A1 Jun. 29, 2017

(30) Foreign Application Priority Data
Mar. 28, 2014 (GB) .................................. 1405647.7

(51) Int. Cl.
*B60G 17/048* (2006.01)
*B60C 17/04* (2006.01)
(Continued)

(52) U.S. Cl.
CPC ............ *B60G 17/048* (2013.01); *B60C 17/04* (2013.01); *B60G 11/27* (2013.01); *B60G 11/62* (2013.01);
(Continued)

(58) Field of Classification Search
CPC . B60G 17/048; B60G 11/27; B60G 2202/152
See application file for complete search history.

(56) References Cited

U.S. PATENT DOCUMENTS

| 240,423 A | 4/1881 | James |
| 1,608,155 A | 11/1926 | Bamebey |
(Continued)

FOREIGN PATENT DOCUMENTS

| CA | 1246464 | 12/1988 |
| CN | 1176188 | 3/1998 |
(Continued)

OTHER PUBLICATIONS

International Search Report for PCT International Application No. PCT/GB2015/050890 dated Jun. 5, 2015.

*Primary Examiner* — Darlene P Condra
(74) *Attorney, Agent, or Firm* — Olive Law Group, PLLC (57) ABSTRACT

The present invention provides apparatus for transferring a load, comprising at least one unitary element of adsorptive material that increases an effective working volume of an enclosure for containing a pressurized gas that transfers a load between a first load transfer element and a further load transfer element. Use of at least one unitary element of adsorptive material is also provided to increase an effective working volume of an enclosure for containing a pressurized gas that transfers a load between a first load transfer element and a further load transfer element. A method of transferring a load is also provided.

16 Claims, 5 Drawing Sheets

(51) Int. Cl.
    *B60G 11/27* (2006.01)
    *B60G 11/62* (2006.01)
    *F16F 9/00* (2006.01)
    *F16F 9/02* (2006.01)

(52) U.S. Cl.
    CPC .............. *F16F 9/003* (2013.01); *F16F 9/02*
        (2013.01); *B60G 2202/152* (2013.01)

(56) References Cited

U.S. PATENT DOCUMENTS

| | | | |
|---|---|---|---|
| 2,423,702 A | 7/1947 | Hart | |
| 3,539,467 A | 11/1970 | Bozarth et al. | |
| 4,000,236 A | 12/1976 | Redfarn et al. | |
| 4,194,891 A | 3/1980 | Earls | |
| 4,509,730 A | 4/1985 | Shtarkman | |
| 5,413,316 A * | 5/1995 | Easter | B60G 17/0155 |
| | | | 267/64.24 |
| 5,482,260 A | 1/1996 | Shmidt | |
| 5,509,641 A * | 4/1996 | Prinzler | B60G 15/10 |
| | | | 267/64.19 |
| 5,894,874 A | 4/1999 | Yamagiwa | |
| 6,250,613 B1 * | 6/2001 | Koeske | B60G 11/28 |
| | | | 267/122 |
| 6,303,060 B1 * | 10/2001 | Lobo | B29C 44/1271 |
| | | | 152/246 |
| 6,482,520 B1 | 11/2002 | Tzeng | |
| 6,851,665 B2 | 2/2005 | McLaughlin | |
| 7,112,272 B2 * | 9/2006 | Hughes | B01D 39/1661 |
| | | | 264/41 |
| 8,297,262 B2 | 10/2012 | Lang | |
| 9,234,557 B2 * | 1/2016 | Brookes | B60G 11/27 |
| 9,255,520 B2 | 2/2016 | Havel | |
| 2004/0100005 A1 | 5/2004 | McLaughlin | |
| 2005/0056582 A1 * | 3/2005 | Patel | B01D 29/114 |
| | | | 210/266 |
| 2005/0098931 A1 | 5/2005 | Schisler | |
| 2006/0011064 A1 | 1/2006 | Carruthers | |
| 2007/0056954 A1 | 3/2007 | Tennison et al. | |
| 2008/0111288 A1 * | 5/2008 | Howard | F16F 9/0409 |
| | | | 267/64.27 |
| 2009/0188392 A1 | 7/2009 | Carruthers | |
| 2009/0302514 A1 * | 12/2009 | Grabarz | B60G 11/27 |
| | | | 267/64.27 |
| 2011/0139129 A1 | 6/2011 | Lang | |
| 2012/0153550 A1 * | 6/2012 | Sigirtmac | B60G 7/04 |
| | | | 267/64.27 |
| 2013/0219892 A1 | 8/2013 | Havel | |
| 2014/0069871 A1 * | 3/2014 | Brown | B01D 29/111 |
| | | | 210/663 |
| 2014/0167337 A1 * | 6/2014 | Ramsey | F16F 9/057 |
| | | | 267/124 |
| 2015/0217620 A1 * | 8/2015 | Berg | B60G 17/0432 |
| | | | 280/6.157 |
| 2016/0153513 A1 * | 6/2016 | Nieten | F16F 9/0409 |
| | | | 267/64.27 |
| 2016/0186829 A1 * | 6/2016 | Coakley | F16F 9/003 |
| | | | 152/520 |
| 2016/0332497 A1 * | 11/2016 | Keeler | B60G 15/12 |
| 2017/0113173 A1 * | 4/2017 | Fowler | B01D 53/0407 |

FOREIGN PATENT DOCUMENTS

| | | |
|---|---|---|
| CN | 2663729 | 12/2004 |
| CN | 2824994 | 10/2006 |
| CN | 101200562 | 6/2008 |
| CN | 101291819 | 10/2008 |
| DE | 7803501 | 6/1978 |
| DE | 102008017703 | 10/2009 |
| EP | 0604867 | 6/1994 |
| EP | 0942194 | 9/1999 |
| EP | 1939015 | 7/2008 |
| GB | 152446 | 10/1920 |
| GB | 1505479 | 3/1978 |
| JP | 55125346 | 9/1980 |
| JP | 0214715 | 1/1990 |
| JP | H04-254023 | 9/1992 |
| JP | H04-266508 | 9/1992 |
| JP | 5296277 | 11/1993 |
| JP | H07-008118 | 1/1995 |
| JP | H07290914 | 11/1995 |
| JP | H11-303919 | 11/1999 |
| JP | 2007-321936 | 12/2007 |
| WO | 9007970 | 7/1990 |
| WO | 9707999 | 3/1997 |
| WO | 0225190 | 12/2004 |
| WO | 2007002479 | 1/2007 |
| WO | 2010/006167 | 1/2010 |
| WO | 2012052776 A1 | 4/2012 |
| WO | 2013068763 A1 | 5/2013 |

* cited by examiner

TRANSFER METHOD AND APPARATUS

CROSS REFERENCE TO RELATED APPLICATIONS

This application is a 35 U.S.C. 371 application of PCT International Patent Application No. PCT/GB2015/050890, filed Mar. 25, 2015, which claims priority to Great Britain Patent No. 1405647.7, filed Mar. 28, 2014, which is incorporated herein by reference in its entirety.

FIELD OF THE INVENTION

The present invention relates to a method and apparatus for transferring a load. In particular, but not exclusively, the present invention relates to apparatus for transferring a load that includes an enclosure containing an enhanced effective working volume of a pressurised gas. Such apparatus can include pneumatic devices, such as air springs, struts and tyres or the like, for use in vehicular or industrial applications.

It is known that from time to time forces should be transferred from one location or component part of a system to another. For example, on occasion an urging force may be desired at one location which is generated elsewhere and must be communicated to the desired location. Many systems that rely on a working volume of pressurised gas to transfer a load from one location to another location are known.

An example of a system where load forces are transferred is an air suspension system for a vehicle. Air suspension is a type of vehicle suspension powered by an electric or engine-driven air pump or compressor. The compressor pumps air into an air spring having flexible bellows, usually made from textile-reinforced rubber, which are located between a vehicle chassis and a corresponding axle. The compressor in turn inflates the bellows, and raises the vehicle chassis from the axle. Air suspension is often used in place of conventional steel springs, and in heavy vehicle applications, such as buses and trucks. The purpose of air suspension is to provide a smooth, constant ride quality, but in some cases it is used for ride and handling purposes on sports cars which desire a relatively stiff spring rate and hard ride quality. Modern electronically-controlled air suspension systems for automobiles and light trucks typically provide a chassis self-leveling function for towing and cornering purposes, and to allow a vehicle to maintain the same ride height regardless of load.

Such systems may also provide raising and lowering functions, such as for lowering a vehicle chassis when travelling along a motorway at relatively high speed for aerodynamic and fuel efficiency benefits or for raising a vehicle chassis to increase ride height for off-road applications.

Conventional air springs typically include convoluted air springs and reversible sleeve air springs. It is known that a direct relationship exists between the spring rate and natural frequency of an air spring and isolation effectiveness. Generally, the lower the spring rate or natural frequency of an air spring, the better the isolation effectiveness. It is also known to lower the spring rate and natural frequency, and hence increase the isolation effectiveness, of an air spring by adding an auxiliary reservoir. Of course, there must be free flow of air between the air spring and the auxiliary reservoir and the auxiliary reservoir should be mounted as close as possible to the air spring. However, using auxiliary reservoirs is expensive, bulky and heavy and increases maintenance costs of a load-bearing system.

An optional bumper may also be provided inside the chamber which is typically mounted on the upper or lower bead plates of a convoluted air spring or on an upper surface of the piston of a reversible sleeve air spring. A bumper is used to support the vehicle when the bellows are deflated, such as when the vehicle is not in use or when there is a system failure. The bumper may also provide some cushioning/protection in the event of a high impact shock load to the air spring. The bumper is typically made of rubber, fabric or a combination of rubber and fabric. However, a bumper takes up space within the chamber, adds weight to the system and increases the spring rate and natural frequency of the air spring.

It has been suggested in WO2012/052776 to include activated carbon in granular form in the chamber of an air spring to lower the spring rate and natural frequency of the air spring. However, whilst this works well in practice, certain uses and conditions can cause the granules to break up and generate dust which adversely affects the air spring and/or other components in the system. For example, inlet valves and filter assemblies can become blocked, the spring rate and natural frequency of the air spring can uncontrollably change, and the air spring can become undesirably noisy. Furthermore, a separate component is required to contain and support the granules of activated carbon in the chamber which adds cost, complexity and weight to the air spring.

SUMMARY OF THE INVENTION

It is an aim of the present invention to at least partly mitigate the above-mentioned problems.

It is an aim of certain embodiments of the present invention to provide a less complex, robust and efficient load transfer apparatus and method for transferring a load, particularly in terms of structure, weight and packaging volume.

It is an aim of certain embodiments of the present invention to provide a unitary element of adsorptive material, such as activated carbon, zeolite, silicalite or the like, which can enhance/increase an effective working volume of a chamber and which is self-supporting and has a strength to withstand a compressive and/or tensile load being transferred from a first load transfer element to a further load transfer element via a pressurised gas.

It is an aim of certain embodiments of the present invention to provide a unitary element of adsorptive material, such as activated carbon, zeolite, silicalite or the like, which is self-containing and does not require an additional component to contain, encase and/or support the adsorptive material in situ.

It is an aim of certain embodiments of the present invention to provide a unitary element of adsorptive material, such as activated carbon, zeolite, silicalite or the like, which withstands a vibrational environment, such as in an air spring of a vehicle, and which does not break up and/or create dust when subjected to such vibrational conditions in use.

It is an aim of certain embodiments of the present invention to provide an air spring, such as a convoluted air spring, a reversible sleeve air spring, a gas strut or a wheel, which includes a monolith of activated carbon or other suitable adsorptive material which helps modify a natural spring rate without the risk of contamination and whilst minimising a number of component parts.

According to a first aspect of the present invention there is provided apparatus for transferring a load, comprising:
- at least one unitary element of adsorptive material that increases an effective working volume of an enclosure for containing a pressurised gas that transfers a load between a first load transfer element and a further load transfer element.

Aptly, the unitary element is a self-supported monolith of adsorptive material.

Aptly, the unitary element of adsorptive material comprises activated carbon.

Aptly, the activated carbon has an N2 surface area in excess of about around 1500 m2/g.

Aptly, the unitary element of adsorptive material further comprises a binder.

Aptly, the unitary element of adsorptive material comprises at least one channel extending inwardly from an outer surface of the unitary element.

Aptly, the at least one channel is a through hole.

Aptly, the unitary element of adsorptive material decreases an effective spring rate associated with the enclosure.

Aptly, an outer surface of the unitary element provides an inner surface of a region of the enclosure.

Aptly, an outer surface of the unitary element transfers a load to/from the pressurised gas responsive to the load applied to a one of the first and further load transfer elements.

Aptly, the working volume of the enclosure is variable to accommodate a change in a pressure of the gas.

Aptly, at least one of the first and further load transfer elements is moveable with respect to a remainder one of the first and further load transfer elements responsive to the load being applied to a one of the first and further load transfer elements.

Aptly, the working volume is variable responsive to the load being applied to a one of the first and further load transfer elements.

Aptly, at least one of the first and further load transfer elements comprises the unitary element of adsorptive material.

Aptly, the enclosure comprises an inlet valve having an open and closed state that is selectable to introduce or exhaust the pressurised gas into or from the enclosure.

Aptly, the enclosure is a sealed enclosure when the inlet valve is closed.

Aptly, the apparatus is a pneumatic device comprising a flexible wall portion extending between the first and further load transfer elements to define the enclosure.

Aptly, the pneumatic device has a first state and a further state, the pressurised gas contained in the enclosure being subjected to a first pressure in the first state and a further pressure in the further state.

Aptly, the pneumatic device has a first state and a further state, a first internal volume of the enclosure when in the first state being different to a further internal volume of the enclosure when in the further state.

Aptly, the pneumatic device is a reversible sleeve air spring further comprising a piston member, said unitary element of adsorptive material defining at least a portion of the piston member.

Aptly, the unitary element of adsorptive material is partially enveloped by a portion of the bellows.

Aptly, the air spring is a convoluted air spring further comprising at least one bumper member located in the enclosure and mounted to at least one of the upper and lower load transfer elements, said unitary element of adsorptive material defining the bumper member.

Aptly, the air spring is a gas strut comprising a cylinder and a moveable piston member, said unitary element of adsorptive material defining the piston member and/or a portion of the cylinder.

Aptly, the air spring is a wheel comprising a rim and a tyre attached to the rim, said unitary element of adsorptive material being located on the rim and/or the tyre.

Aptly, a plurality of spaced apart unitary elements of adsorptive material are circumferentially arranged around the rim and/or tyre.

Aptly, the apparatus further comprises:
- a compressor unit to pressurise gas for providing a source of pressurised gas to the enclosure of the pneumatic device.

According to a second aspect of the present invention there is provided a pneumatic system comprising apparatus according to the first aspect of the present invention.

Aptly, the system comprises a plurality of pneumatic devices, such as air springs and/or actuators.

Aptly, the system further comprises at least one compressor unit to pressurise gas for providing a source of pressurised gas to each of the plurality of pneumatic devices.

Aptly, the system further comprises a container for storing pressurised gas from the compressor unit and selectively supplying pressurised gas to each of the pneumatic devices.

Aptly, the system further comprises at least one valve for selectively supplying pressurised gas to each of the pneumatic devices.

Aptly, the system is an air suspension system for a vehicle.

According to a third aspect of the present invention there is provided a vehicle comprising apparatus according to the first aspect of the present invention or a system according to the second aspect of the present invention.

Aptly, the vehicle is one of a car, a truck, a van, a train, an airplane or a ship.

According to a fourth aspect of the present invention there is provided use of at least one unitary element of adsorptive material to increase an effective working volume of an enclosure for containing a pressurised gas that transfers a load between a first load transfer element and a further load transfer element.

According to a fifth aspect of the present invention there is provided use of at least one unitary element of adsorptive material in an enclosure of an air spring to decrease an effective spring rate of the air spring.

According to a sixth aspect of the present invention there is provided a method for transferring a load, comprising:
- applying a load to a one of a first load transfer element and a further load transfer element; and
- transferring the load to a remainder one of the first load transfer element and the further load transfer element via a pressurised gas contained in an enclosure that has an effective working volume increased by at least one unitary element of adsorptive material.

Aptly, the unitary element is a self-supported monolith of adsorptive material.

Aptly, the unitary element of adsorptive material comprises activated carbon.

Aptly, the method further comprises:
- decreasing an effective spring rate associated with the enclosure via the at least one unitary element of adsorptive material.

Aptly, the method further comprises:
moving a one of the first and further load transfer elements with respect to a remainder one of the first and further load transfer elements responsive to the applied load.

Aptly, the method further comprises:
introducing further pressurised gas into the enclosure or exhausting the pressurised gas from the enclosure via an inlet valve to move the one of the first and further load transfer elements.

According to a seventh aspect of the present invention there is provided a method and/or apparatus for transferring a load wherein at least one unitary non granular element of absorptive material increases an effective working volume of a working gas that, in use, transfers a load between a first and a further load transfer element.

Certain embodiments of the present invention may provide an apparatus and method for reducing the spring rate/natural frequency of a pneumatic device such as an air spring or actuator, whilst providing a less complex, robust and efficient load transfer apparatus particularly in terms of structure, weight and packaging volume.

Certain embodiments of the present invention provide a unitary element or multiple unitary elements (such as elements which are integrally formed) of an adsorptive material to enhance an effective working volume for a fluid where they are located.

Certain embodiments of the present invention may provide a unitary element of adsorptive material, such as activated carbon, zeolite, silicalite or the like, for use in a load transfer apparatus, such as an air spring or actuator, and which is self-supporting and has a strength to withstand a load being transferred from a first load transfer element to a further load transfer element via a pressurised gas.

Certain embodiments of the present invention may provide a unitary element of adsorptive material, such as activated carbon, zeolite, silicalite or the like, for use in a load transfer apparatus, such as an air spring or actuator, and which is self-containing and does not require an additional component to contain, encase and support the adsorptive material in situ.

Certain embodiments of the present invention may provide a unitary element of adsorptive material, such as activated carbon, zeolite, silicalite or the like, for use in a load transfer apparatus, such as an air spring or actuator, which withstands a vibrational environment and which does not break up and/or create dust when subjected to such vibrations in use.

BRIEF DESCRIPTION OF DRAWINGS

Embodiments of the present invention will now be described hereinafter, by way of example only, with reference to the accompanying drawings in which.

DESCRIPTION OF EMBODIMENTS

In the drawings like reference numerals refer to like parts.

Figure 1:
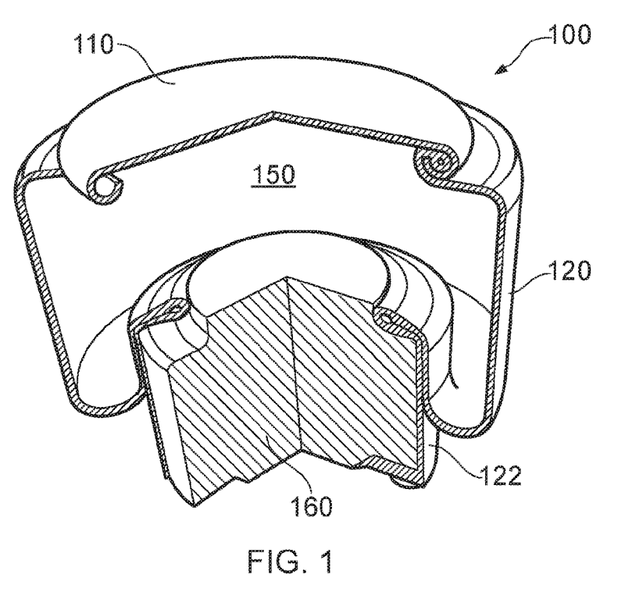
FIG. 1 illustrates a section through a reversible sleeve air spring according to an embodiment of the present invention.

As shown in FIG. 1, a reversible sleeve air spring 100 according to certain embodiments of the present invention includes an upper bead plate 110, bellows 120 and a unitary element 160 of activated carbon. The upper bead plate 110, bellows 120 and unitary element 160 define an enclosure 150 having a working volume for a pressurised gas, such as air, carbon dioxide, nitrogen or the like.

A lower portion 122 of the bellows 120 partially envelopes the unitary element of activated carbon 160 to effectively attach the unitary element to the bellows 120 and form a piston member 122, 160 of the reversible sleeve air spring 100. The bellows also help to protect the unitary element in use. Furthermore, this arrangement allows the bellows/piston formation to be a continuous, uninterrupted formation without the requirement for joining a separate hollow piston body to the bellows via an end closure as in a conventional reversible sleeve air spring. The bellows portion 122 which is reinforced with layers of fibres/mesh has a high tensile strength and the monolith 160 of activated carbon has a relatively high compressive strength thus providing a relatively high strength composite piston member.

A valve (not shown) is provided in the upper bead plate 110 or in the vicinity of the air spring 100 to govern a source of pressurised gas connected by an air line to the air spring 100 for inflating the bellows 120 or to allow gas to be exhausted from the chamber 150. In turn, the internal pressure of the chamber 150 and height of the air spring 100 can be controlled. For example, the air spring may be used as an actuator to apply a load to an object, such as raising a vehicle chassis, or as a damper to receive and isolate a load from an object. In use, a load (not shown) is transferred between the upper bead plate 110 and a lower load transfer element (not shown) attached to the piston 122, 160 via the pressurised gas in the chamber 150. The enclosure is a sealed enclosure when the inlet valve is closed.

It will be understood that the term 'working volume' refers to the space or chamber defined by the sealed enclosure in which the pressurised working gas is located. In use, the volume is dynamic as a supported load is being transferred from one load transfer element, e.g. the upper bead plate 110, to another load transfer element, e.g. a lower support surface engaged with the piston 122,160 or the piston itself, via the pressurised gas contained in the enclosure.

It will also be understood that, whilst certain embodiments of the present invention described herein refer to a unitary element of activated carbon, other examples of adsorptive material can be used, such as zeolite, silicalite, or the like. The term 'activated carbon' in accordance with certain embodiments of the present invention relates to a family of carbonaceous materials specifically activated to develop strong adsorptive properties whereby even trace quantities of liquids or gases may be adsorbed onto the carbon. Such activated carbons may be produced from a wide range of sources, for example coal, wood, nuts (such as coconut) and bones and may be derived from synthetic sources such as polyacrylonitrile or the like. Various methods of activation exist, such as selective oxidation with steam, carbon dioxide or other gases at elevated temperatures or chemical activation using, for example, zinc chloride or phosphoric acid. An example of an activated carbon is Cellcarb™, or the like, which is commercially available from Chemviron Carbon Limited, 434 London Road, West Thurrock, Grays, Essex, RM20 4DH, UK.

The unitary element 160 is a monolith of activated carbon comprising many small, low volume pores that significantly increase the surface area available for adsorption and desorption of gas molecules. The presence of the adsorptive material in the chamber increases the effective working volume of the chamber 150 for receiving and containing pressurised gas without having to increase the size of the air spring, and in particular the enclosure itself. This in turn lowers the effective spring rate and natural frequency of the air spring 100 relative to a spring rate and natural frequency of the same air spring but without the adsorptive material. Lowering the spring rate and natural frequency of the air spring increases the isolation effectiveness of the air spring. In vehicular applications, a smoother ride is achieved, and in other industrial applications, better vibration shielding or isolation is achieved. The rate at which the gas molecules are adsorbed and desorbed by the monolith of activated carbon 160 increases with increased pressure. One or more such unitary elements can be located in the chamber.

Figure 2:
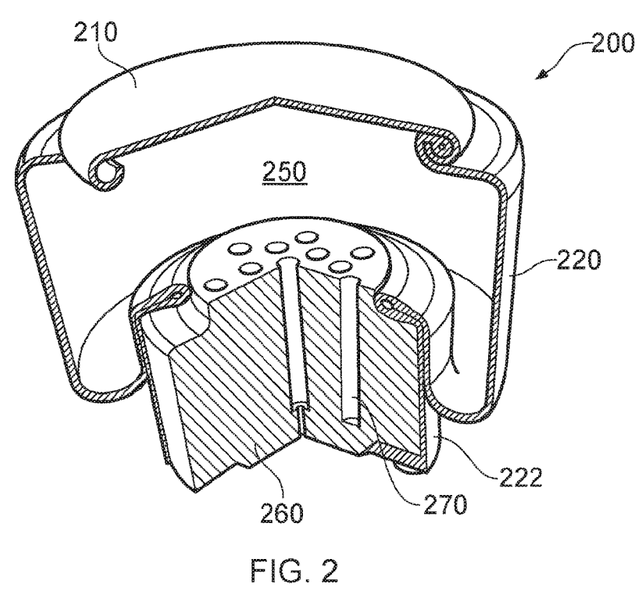
FIG. 2 illustrates a section through a reversible sleeve air spring according to a further embodiment of the present invention.

In addition, the unitary element of activated carbon 160 has an effective structural strength to be self-supporting without requiring a separate containing wall or casing which would otherwise be required if the adsorptive material was in granular or powder form for example. This desirably reduces the number of components, packaging requirements and overall weight and cost of the air spring. Furthermore, in view of the relatively high vibrational environment in some applications such as a heavy or high performance vehicle air spring for example, the risk of the unitary element 160 breaking up and/or creating dust or dirt, which could adversely affect the air spring and/or other components in an air suspension system, such as inlet valves and filter assemblies, is significantly reduced. In addition, the unitary element of activated carbon 160 can optionally provide a degree of structure to the air spring 100. For example, the unitary element 160 can be used to form the piston member of an otherwise conventional reversible sleeve air spring, as illustrated in FIGS. 1 and 2. This reduces the complexity, cost and weight of the air spring relative to conventional systems. An upper surface of the unitary element 160 defines a portion of the chamber which helps provide a transfer path for transferring at least a portion of a load being supported by the air spring and being transferred between the upper and lower plates via the bellows and pressurised gas. One or more unitary elements may also be provided on an inner surface of the upper bead plate 110 and/or bellows 120 and may be any suitable shape, such as a cylinder, disc, ring or the like. The unitary element may optionally also be used as a support surface for mounting components inside the chamber such as valves, sensors, or the like.

As shown in FIG. 2, the unitary element 260 includes a plurality of channels 270 extending downwardly from an upper surface of the unitary element into the core of the unitary element. The channels 270 help ensure pressurised gas is received into the core of the monolith and to achieve a high-frequency response to pressure change in the chamber. The channels 270 shown in FIG. 2 have a circular cross section and are substantially straight channels but may be any suitable cross section, such as square or triangular, and may follow a curved path for example. The channels 270 may terminate in the core of the unitary element or may be through holes, or a combination of both. The channels 270 may extend in any suitable direction, such as transversely or longitudinally with respect to an axis of the monolith 260 (as shown in FIG. 2).

Figure 3:
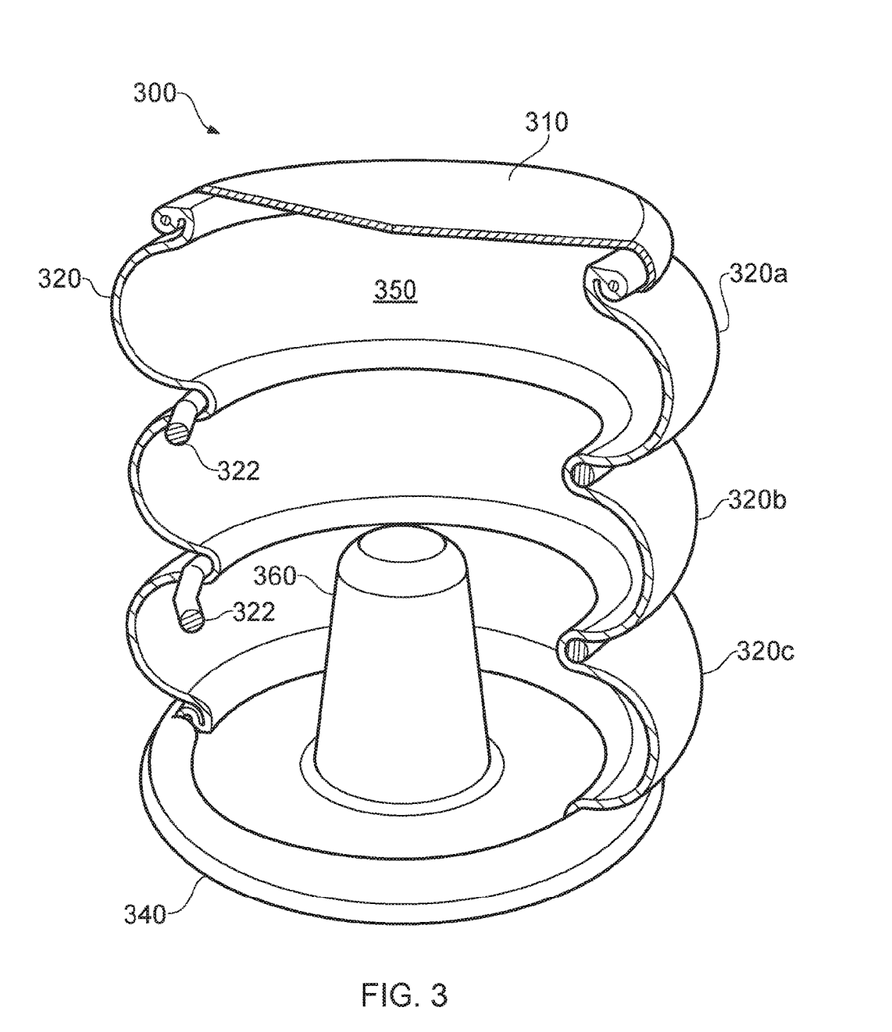
FIG. 3 illustrates a section through a convoluted air spring according to a further embodiment of the present invention.

A different type of air spring, known as a convoluted air spring, is illustrated in FIG. 3. This air spring 300, according to certain embodiments of the present invention, includes an upper bead plate 310, a lower bead plate 340 and a bellows 320 extending therebetween to define a chamber 350 for containing pressurised gas. A pair of spaced apart girdle hoops 322 define three convoluted portions 320a-320c of the bellows 320. A bumper 380 is located inside the chamber and secured to the lower bead plate 340 to support the vehicle when the bellows are deflated, such as when the vehicle is not in use or when there is a system failure, and/or to provide some cushioning/protection in the event of a high impact shock load to the air spring. The bumper 380 is formed of the unitary element (monolith) of activated carbon. In other words, a bumper of hard rubber, for example, in a conventional convoluted air spring is effectively replaced with the unitary element of activated carbon 360. Like the reversible air spring 100 of FIGS. 1 and 2, the monolith of activated carbon increases the effective working volume of the chamber and lowers a spring rate/natural frequency of the air spring, whilst also simplifying the construction and reducing the overall weight and packaging volume of the air spring. Like the embodiment illustrated in FIG. 2, the unitary element 360 may comprise a plurality of channels to increase the response rate of adsorption and desorption of the gas molecules. Alternatively or additionally, the air spring of FIG. 3 may include a unitary element of activated carbon, or other suitable adsorptive material as described above, extending downwardly from the upper bead plate 310 which may take the form of a bumper member or may be any other suitable shape, such as a circular disc or ring, or the like.

Figure 4:
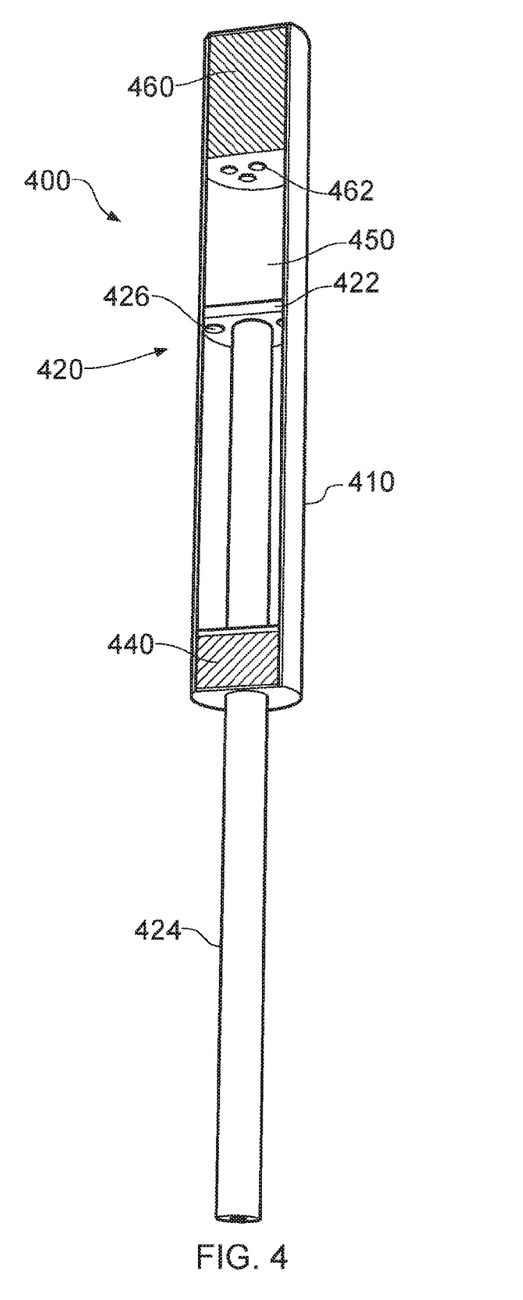
FIG. 4 illustrates a section through a pneumatic strut according to a further embodiment of the present invention.

FIG. 4 illustrates a gas strut 400 according to another embodiment of the present invention. The strut 400 includes a cylinder body 410 and a piston 420 having a head portion 422 and a rod portion 424. The rod portion 424 is supported by a seal member 440 located at one end of the cylinder body 410. The piston 420 moves axially along the cylinder body 410 in sealing engagement therewith to increase or decrease the working volume of a chamber 450 defined by the piston and cylinder and thus respectively decreases and increases the pressure of a gas, typically a pressurised gas, in the chamber. The piston head 422 includes apertures 426 to allow some gas to pass therethrough but the rod portion will occupy a growing proportion of the working volume of the chamber as the piston travels into the cylinder body thus increasing the pressure in the chamber. At a second end of the cylinder body, an end opposite to the seal member 440, is located a monolith element of activated carbon 460 forming a wall of the chamber 450 and which optionally adds a degree of structural strength to the gas strut. The monolith element 460 may be any suitable shape and may include one or more channels 462 extending longitudinally into the monolith element 460 to ensure pressurised gas is received into the core of the monolith in use and to achieve a high-frequency response to pressure change in the chamber. The monolith is self-supporting and does not require a container or plate, for example, to hold the activated carbon in place as would be required if the activated carbon was in granular form for example. The monolith may also include channels as shown in FIGS. 1 to 3.

A conventional gas strut has a spring rate which is more linear than a metal spring equivalent. Nonetheless, the spring rate increases as the piston approaches an end section of the cylinder body as the gas in the chamber is compressed as the cylinder volume is decreased. By contrast, the monolith of activated carbon, according to certain embodiments of the present invention, lowers a relative spring rate of the gas strut 400. In other words, the gas strut 400 behaves as if it is longer than it actually is. In practice, this means that the spring rate can be more linear across the whole of the stroke of the piston. Looking at the technical effect another way, the effective working volume has been increased such that the same gas strut performance can be obtained by a physically smaller gas strut in comparison to a conventional gas strut. The smaller gas strut can be shorter where previously redundant stroke was used, or narrower where extra volume was previously necessary to compensate for the piston rod taking up the working volume of the chamber.

Figure 5:
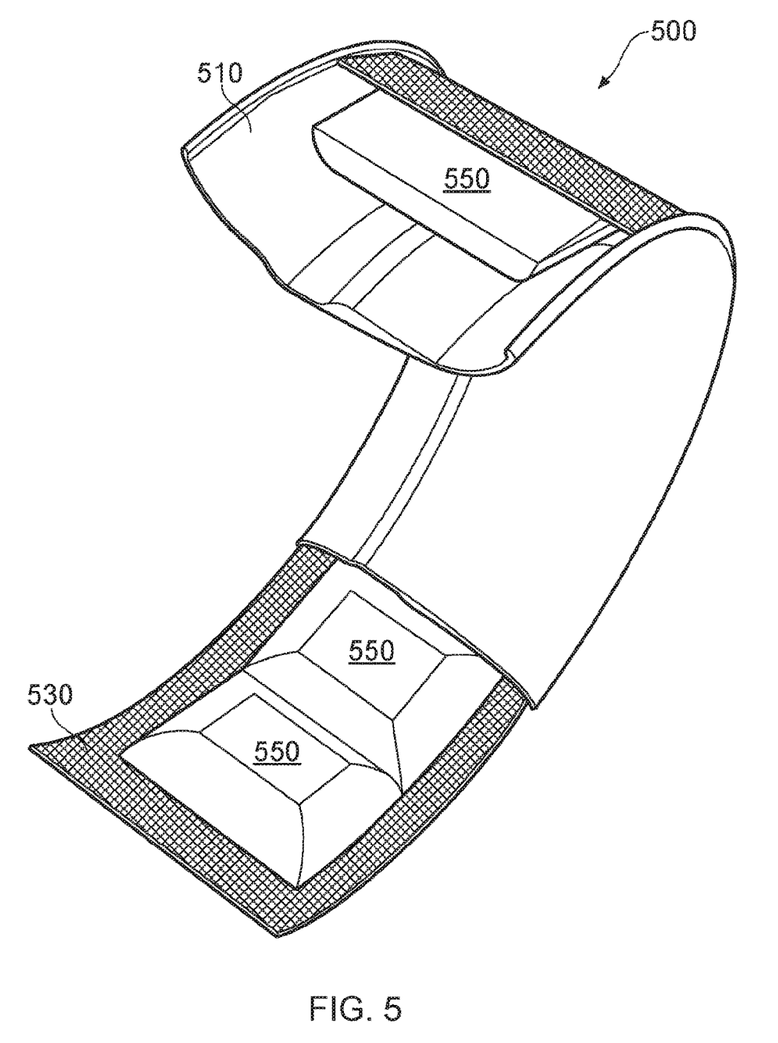
FIG. 5 illustrates a section through a wheel according to a further embodiment of the present invention.

FIG. 5 shows a cutaway of a wheel 500 including a rim 510 and a tyre (not shown) secured to the rim to define a sealed chamber for containing pressurised gas such as air. The gas is received in the chamber via a valve (not shown). The chamber is sealed when the valve is closed. In use, the side walls of an inflated tyre transfer torque to a tyre tread and the ground and also form tensile structures of the tyre (when the tyre is fully inflated) for bearing the majority of load in use. It is often desirable to change the inflation state of the tyre to achieve differently-sized contact patches with the ground, such as when travelling over relatively soft ground like sand which requires a larger contact patch than would be needed when travelling over hard ground like tarmac. A source (not shown) of pressurised gas, such as a compressed air store or compressor or the like, may be connected to each wheel of a vehicle for selectively inflating or deflating the tyres as desired either manually by the driver or automatically via a tyre pressure monitoring system of the vehicle, for example.

A number of unitary elements 550 of activated carbon are located in the chamber of the wheel to increase the effective working volume of the tyre. If the side walls of the tyre are particularly flexible, the adsorptive material may also reduce the effective spring rate of the wheel and increase the isolation characteristics of the wheel to provide a softer ride. The unitary elements may be attached to the rim, tyre or both the rim and the tyre. Alternatively, the unitary elements may be attached to a carrier 530 extending across the rim at a point below where the tyre fits against the rim. The unitary elements increase the effective working volume of the wheel and thus, in the event of the integrity of the tyre becoming compromised or a leak between the rim and tyre or from a valve, the tyre will take longer to deflate than a conventional wheel of the same size allowing more time to navigate the vehicle to a safe location.

Certain embodiments of the present invention provide air spring pots, rolling pistons, air bags, strut/coil spring combination, vehicle cab and seat suspension systems, door mechanisms, pneumatic jacks, and other applications which employ pneumatic springs, actuators, dampers, isolators or inflatable structures to transfer a load. Alternatively, certain embodiments of the present invention exclude certain types of air springs and struts, such as rolling lobe pistons or reversible sleeve air springs, convoluted air springs, gas struts, and/or air spring pots.

Figure 6:
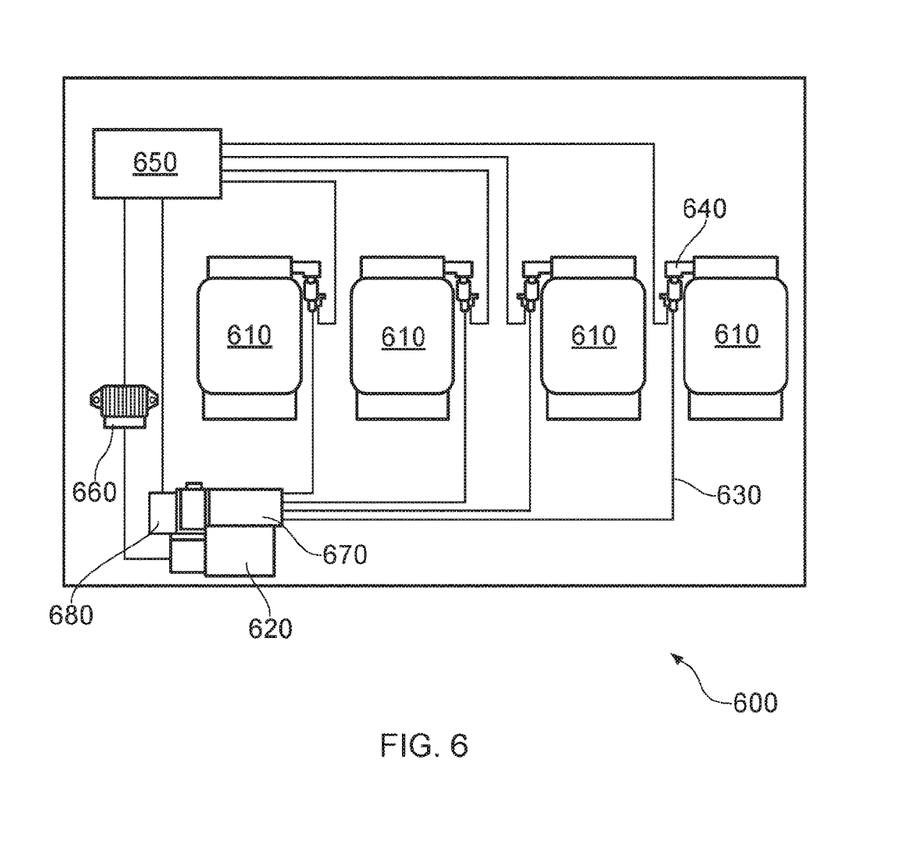
FIG. 6 illustrates an air suspension system including air springs according to certain embodiments of the present invention.

A further embodiment of the present invention is illustrated in FIG. 6. An air suspension system for a vehicle includes four air springs 610 each respectively located at a corresponding corner of a vehicle between the chassis and a corresponding axle. Each air spring 600, such as a reversible sleeve air spring 100 or convoluted air spring 300 as shown in FIGS. 1 to 3 respectively, is connected to a 12V compressor unit 620 via respective air lines 630 for selectively providing pressurised gas, e.g. compressed air, to each air spring 600. Each air spring 600 has a corresponding solenoid valve 640 for controlling the input and exhaust of pressurised into and from the air spring. A vent solenoid 680 is provided on the compressor unit 620 to allow air to leave the system entirely if required. The valves 640 and compressor unit 620 are controlled by an on-board controller 650 or ECU. A solid state relay 660 is also provided between the controller and the compressor unit. The compressed air is passed through a dryer 670 to capture any moisture in the system when the air is compressed and to ensure the air in the system remains dry to reduce the risk of corrosion occurring. In accordance with certain embodiments of the present invention, as shown in FIGS. 1 to 3, each air spring 600 includes at least one unitary element of activated carbon, or other suitable adsorptive material as described above, for increasing the effective working volume of each air spring whilst reducing the natural spring rate of each air spring. Sensors (not shown) are provided on the vehicle to determine vehicle height from the ground which is monitored by the controller 650. If, for example, a corner of the vehicle is lower than a pre-set or selectable height, the controller 650 will operate the compressor 620 and open a corresponding valve 640 to further inflate a corresponding air spring 610 and raise the vehicle accordingly. When the vehicle reaches the desired height, the sensors provide a signal to the controller which turns off the compressor and closes the solenoid valves. If a corner of the vehicle is higher than a pre-set or selectable height, the corresponding valve is opened to allow air to exhaust from the corresponding air spring until that corner reaches the desired height. In this manner, the ride height of the vehicle can be controlled automatically. Similarly, the driver may wish to raise or lower the vehicle for a particular terrain or driving condition and can selectively control the system from the cabin by operating a toggle switch or individual switches each corresponding to different ride heights, for example, to raise or lower the vehicle as desired. In use, each air spring 610 acts as a damper to isolate the vehicle from loads being transferred through the air spring from the ground to the vehicle as the vehicle is moving along. As described above, each air spring 610 can also be used as an actuator to selectively raise the vehicle when desired. Similar systems can be envisaged for manually or automatically adjusting the spring rate, height or length of other types of air springs or actuators, such as wheels and gas struts, for example.

Thus, certain embodiments of the present invention may provide a load transfer method and apparatus which increases the effective working volume of an enclosure for containing a pressurised gas whilst decreasing the effective spring rate of the apparatus such as an air spring or strut which contains a working fluid such as a pressurised gas. The unitary element of adsorptive material may optionally provide structure and strength to the enclosure whilst reducing the complexity, cost and weight of the apparatus.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for transferring a load, comprising:
   at least one unitary element of adsorptive material that increases an effective working volume of an enclosure for containing a pressurised gas that transfers a load between a first load transfer element and a further load transfer element,
   wherein the unitary element is a self-supported monolith of adsorptive material and is configured to withstand a load being transferred from the first load transfer element to the further load transfer element via the pressurized gas,
   wherein an outer surface of the unitary element transfers a load to and from the pressurized gas responsive to the load applied to one of the first load transfer element and the further load transfer element.

2. The apparatus as claimed in claim 1, wherein the unitary element of adsorptive material comprises activated carbon.

3. The apparatus as claimed in claim 2, wherein the activated carbon has an N2 surface area in excess of about around 1500 m2/g.

4. The apparatus as claimed in claim 1, wherein the unitary element of adsorptive material comprises at least one channel extending inwardly from the outer surface of the unitary element.

5. The apparatus as claimed in claim 4, wherein the at least one channel is a through hole.

6. The apparatus as claimed in claim 1, wherein the unitary element of adsorptive material decreases an effective spring rate associated with the enclosure.

7. The apparatus as claimed in claim 1, wherein the working volume of the enclosure is variable to accommodate a change in a pressure of the gas.

8. The apparatus as claimed in claim 1, wherein at least one of the first and further load transfer elements is moveable with respect to a remainder one of the first and further load transfer elements responsive to the load being applied to a one of the first and further load transfer elements.

9. The apparatus as claimed in claim 1, wherein at least one of the first and further load transfer elements comprises the unitary element of adsorptive material.

10. The apparatus as claimed in claim 1, wherein the apparatus is a pneumatic device comprising a flexible wall portion extending between the first and further load transfer elements to define the enclosure.

11. The apparatus as claimed in claim 10, wherein the pneumatic device has a first state and a further state, the pressurised gas contained in the enclosure being subjected to a first pressure in the first state and a further pressure in the further state.

12. The apparatus as claimed in claim 10, further comprising:
   a compressor unit to pressurised gas for providing to the enclosure of the pneumatic device.

13. A vehicle comprising the apparatus as claimed in claim 1.

14. Use of at least one unitary element of adsorptive material in an enclosure of an air spring to decrease an effective spring rate of the air spring, wherein the unitary element is a self-supported monolith of adsorptive material and is configured to withstand a load being transferred from a first load transfer element to a further load transfer element via a pressurized gas,
   wherein an outer surface of the unitary element transfers a load to and from the pressurized gas responsive to the load applied to one of the first load transfer element and the further load transfer element.

15. A method for transferring a load, comprising:
   applying a load to a one of a first load transfer element and a further load transfer element; and
   transferring the load to a remainder one of the first load transfer element and the further load transfer element via a pressurised gas contained in an enclosure that has an effective working volume increased by at least one unitary element of adsorptive material,
   wherein the unitary element is a self-supported monolith of adsorptive material that withstands a load being transferred from the first load transfer element to the further load transfer element via the pressurized gas,
   wherein an outer surface of the unitary element transfers a load to and from the pressurized gas responsive to the load applied to one of the first load transfer element and the further load transfer element.

16. The method as claimed in claim 15, wherein the unitary element of adsorptive material comprises activated carbon.

* * * * *